(12) United States Patent
Kharitonenko

(10) Patent No.: US 7,050,641 B1
(45) Date of Patent: May 23, 2006

(54) METHOD OF PROVIDING EXTENSION TO A SIGNAL AND APPARATUS THEREFOR

(75) Inventor: Igor Kharitonenko, Thornleigh (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/890,618

(22) PCT Filed: Feb. 2, 2000

(86) PCT No.: PCT/IB00/00102

§ 371 (c)(1),
(2), (4) Date: Aug. 2, 2001

(87) PCT Pub. No.: WO00/48128

PCT Pub. Date: Aug. 17, 2000

(30) Foreign Application Priority Data

Feb. 9, 1999 (AU) ..................... PP8558

(51) Int. Cl.
*G06K 9/36* (2006.01)
(52) U.S. Cl. .............. 382/240; 382/232; 382/233
(58) Field of Classification Search ........ 382/232–253; 375/240.02, 240.03, 240.11, 240.26, 240.29
See application file for complete search history.

(56) References Cited

U.S. PATENT DOCUMENTS 5,381,354 A * 1/1995 Soloff .................... 708/301
5,710,835 A * 1/1998 Bradley .................. 382/233

* cited by examiner

*Primary Examiner*—Duy M. Dang

(57) ABSTRACT

An sequence of data samples X[n] is point symmetrically extended to provide an extended sequence of samples x[n]. The points of symmetry (25) can be at the ends (17, 19) of the sequence (as in FIG. 4 (*a*)), such that the samples at the ends are not duplicated but the points of symmetry are at the values of those samples. Thus, the extensions are formed by duplications (27) of a predetermined number of the other samples. Alternatively (as shown in FIG. 4 (*b*)), the points of symmetry (25) can be a half-sampling rate beyond (23, 25) the samples at the ends of the sequence so that those samples are also duplicated (27) to provide the extensions. For tiled image data, image compression and reconstruction utilising the point symmetric technique provides a very good reconstructed image with reduced artifacts at the tile boundaries. For this, both locations of the points of symmetry mentioned above need to be utilised for different sequences depending on whether there are odd or even numbers of samples in the sequences and whether the filters used are odd or even in length.

16 Claims, 5 Drawing Sheets

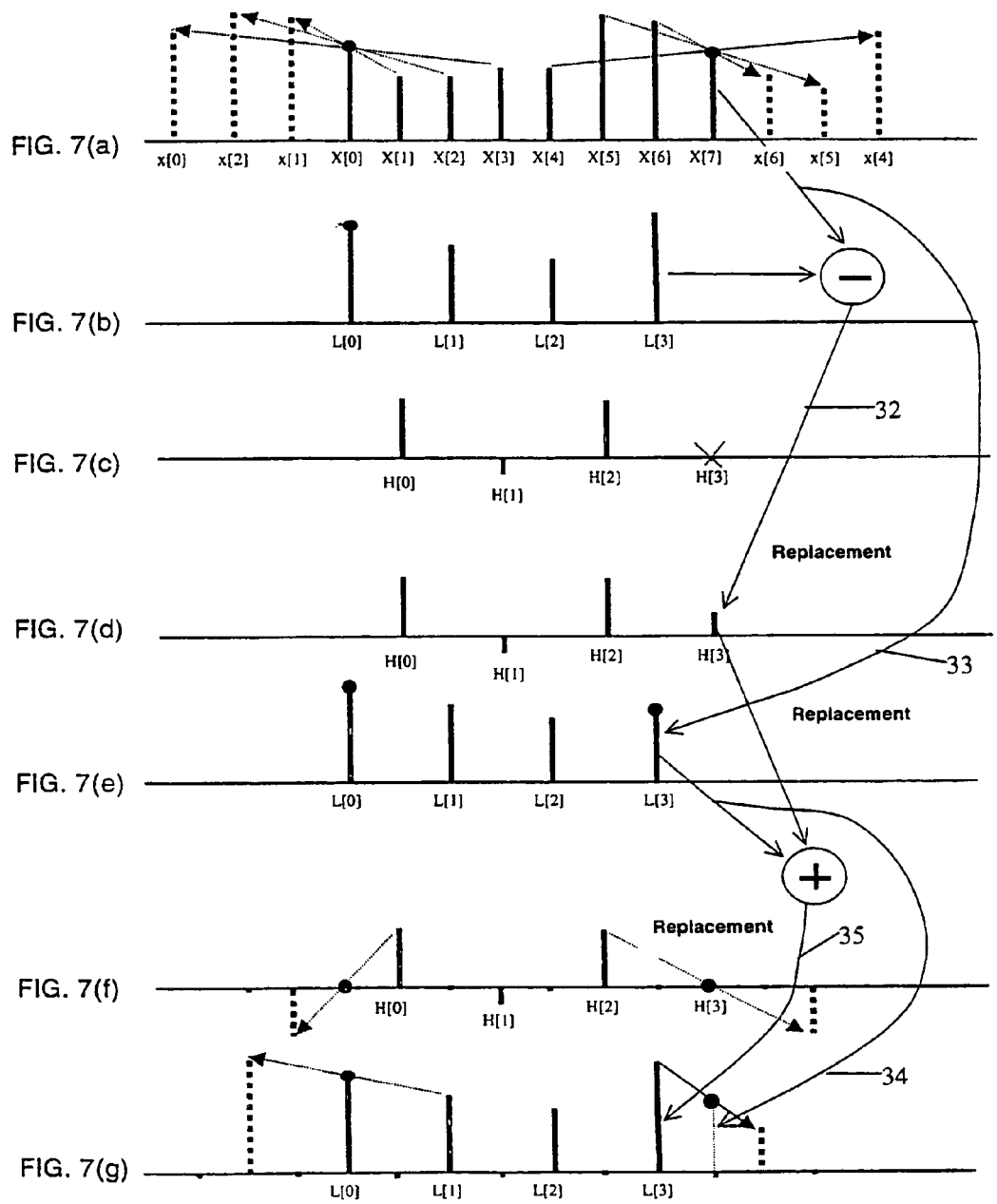

METHOD OF PROVIDING EXTENSION TO A SIGNAL AND APPARATUS THEREFOR

FIELD OF THE INVENTION

This invention relates to a method of providing a signal extension to a finite length signal and to an apparatus therefor, especially, though not exclusively to a method of providing a signal extension to a wavelet transformed signal of finite lengt, for example, in an image compression system. In particular, the invention can be utilised in an image compression system for performing subband coding of large images partitioned (segmented) into non-overlapped tiles.

BACKGROUND OF THE INVENTION

One of the most efficient techniques for image compression is subband coding, such as wavelet transformation, where an image input signal is decomposed into several frequency subbands that are quantised and then coded for onward transmission or storage. Since this process is reversible, the original image signal can be reconstructed back from the coded subband information. An important practical problem in subband signal coding is that a high degree of complexity is introduced by decomposition/reconstruction when the signal length is substantial. This is especially critical for large images. The most commonly used approach to cope with this problem is to break an image into sub-images, known as blocks or tiles, of a smaller size and process them independently. This method, which is usually called non-overlapped tiling, can significantly reduce the complexity, but introduces very noticeable boundary artifacts in the regions of the edges of the tiles in the reconstructed image. Since a human eye is very sensitive to edges especially in uniform areas, these types of distortions are very noticeable and consequently degrade image quality dramatically. The problem of smooth boundary reconstruction is, of course, not limited to image coding, but exists in different aspects in many other applications.

Due to its practical importance, the problem of reducing boundary artifacts has been extensively investigated and described in many publications. One known approach is to use overlapping samples from adjacent tiles, as suggested by I1 Kye Eom, Yoon Soo Kim and Jae Ho Kim in an article entitled "A Block Wavelet Transform for Sub-image Coding/Decoding" published in SPIE Vol. 2669 at pages 169–177 and in U.S. Pat. No. 5,710,835. Another known approach is to employ a variety of post processing techniques at the image reconstruction stage, as described by B. Jeon and J. Jeong in an article entitled "Blocking Artifacts Reduction in Image Compression with Block Boundary Discontinuity Criterion" published in IEEE Trans. on Circuts and Systems for Video Tech. Vol 8, N3, 1998 at pages 345–367 and by J. K. Su and R. M. Mersereau in ana article entitled "Post-processing for Artifact Reduction in JPEG-compressed Images" published in ICASSP-95, Vol. 4 at pages 2363–2366. Unfortunately, most existing methods can only be applied in practical systems with great difficulty due to the substantial additional complexity which they introduce.

In this specification, including the claims, the terms "comprises", "comprising" or similar terms are intended to mean a non-exclusive inclusion, such that a method or apparatus that comprises a list of elements does not include those elements solely, but may well include other elements not listed.

BRIEF SUMMARY OF THE INVENTION

The present invention therefore seeks to provide an image compression system and to a method of coding therefor which overcomes, or at least reduces the above-mentioned problems of the prior art.

Accordingly, in a first aspect, the invention provides a method of providing an extension to at least one end of a signal of finite length at at least one boundary thereof, the extension being formed by reproducing a portion of the finite length signal adjacent to the boundary in an point symmetric fashion about a point on the finite length signal at or close to the boundary.

In a second aspect, the invention provides a method of providing an extension to at least one end of a signal of finite length, the extension being formed by the steps of:

defining a point at the end of the finite length signal;

determining a length of the finite length signal starting from the defined point;

duplicating the determined length in a point symmetric fashion about the defined point so as to provide an extension of the finite length signal beyond the end.

In a preferred embodiment, signal extensions are provided at both ends of the finite length signal. It will be appreciated that the finite length signal could be image data, or could be other data such as speech or other acoustic data, or other data.

According to a third aspect of the present invention, there is provided a method of subband image decomposition comprising the steps of:

receiving image data for an image that has been divided into a plurality of image blocks;

applying a method of providing an extension to at least one end of a signal of finite length, as described above, to the image data for each image block; and decomposing the extended image data for each image block to provide subband decomposed image data.

Preferably, the step of decomposing the extended image data comprises transforming the extended image data using a transform, such as a wavelet transform. In one embodiment, at least part of the decomposed image data is replaced by data formed from a combination of part of the image data and part of the decomposed image data.

In a fourth aspect, the invention provides a method of compressing images comprising the steps of:

receiving image data representing at least one block of an image which has been divided into blocks;

decomposing the received image data using the method of subband image decomposition as described above;

quantising the subband decomposed image data; and coding the quantised subband decomposed image data to provide compressed image data.

In a fifth aspect, the invention provides a method of image tile reconstruction comprising the steps of:

receiving at least two subband sequences of data;

applying the method of providing an extension to at least one end of a signal of finite length at at least one boundary thereof as described above to the subband sequences of data; and performing subband synthesis on the extended subband sequences to produce reconstructed image tiles.

In a preferred embodiment, two subband sequences are received. In one embodiment, at least one of the received subband sequences includes combined data formed from a combination of original image data and decomposed image data. Preferably, the step of performing subband synthesis includes the step of combining at least the received combined data with other data from at least one of the received subband sequences.

BRIEF DESCRIPTION OF THE DRAWINGS

One embodiment of the invention will now be more fully described, by way of example, with reference to the drawings, of which:

FIG. 7 shows sequences of data samples to illustrate subband analysis of even-length sequences using odd-length filters;

DETAILED DESCRIPTION OF THE INVENTION

Figure 1:
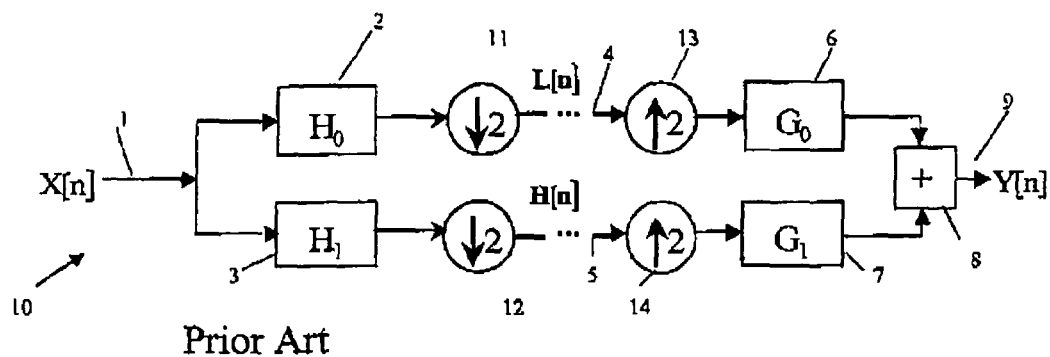
FIG. 1 shows a simplified block diagram of a well-known two-channel one-dimensional analysis and synthesis filter bank.

Subband decomposition can be applied to images in a number of different ways depending on the application. Never the less, most of them are based on the same analysis/synthesis operation schematically presented in FIG. 1. In general, there are two analysis filters in a first, analysis section: a low pass filter $H_0$ 2 and a high pass filter $H_1$ 3 and a synthesis section, which also includes two filters: a low pass filter $G_0$ 6 and a high pass one $G_1$ 7. An input sequence X[n] from an input 1 is low and high pass filtered firstly by filters 2 and 3. Then the low and high pass components from the filters are downsampled by a factor of two, producing outputs L[n] and H[n]. The low frequency subband L[n] and the high frequency subband H[n] can be used for further decomposition or quantised. At the synthesis stage, the low frequency subband L[n] passing through flow 4 and the high frequency subband H[n] passing through flow 5 are upsampled by factor of two, low and high pass filtered by low pass filter $G_0$ 6 and high pass filter $G_1$ 7. Finally, both subbands are summed by adder 8 to produce an output sequence Y[n] at an output 9, which would be equal to X[n] if the operation has the property of perfect reconstruction.

A broad class of linear filters such as QMF, CQF and wavelets can be used in $H_0$, $H_1$, $G_0$ and $G_1$. However, regardless of the filter type, a proper extension of the input sequences X[n], L[n] and H[n] must be applied to perform the convolution properly. Very good results can be achieved by using the known symmetric extension shown in FIG. 2. It is based on a mirror symmetry and the supplementary samples x[i] (dashed lines) can be easily found by copying the signal samples X[i] (firm lines) around an axis of symmetry 11 and 13 as illustrated by arrows 15. This operation can be expressed by a formula:

$$x[i]=X[i],$$

where i=[1, . . . , k] for odd-length filters, or i=[0, . . . , k−1] for even-length filters, where k is the number of samples required to extend the sequence.

Figure 2:
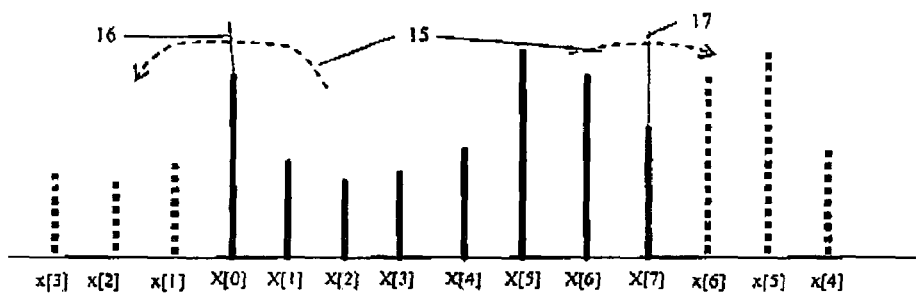
FIG. 2 shows a sequence of data samples in a sequence of finite length having extensions produced using a common symmetric method.
Figure 3:
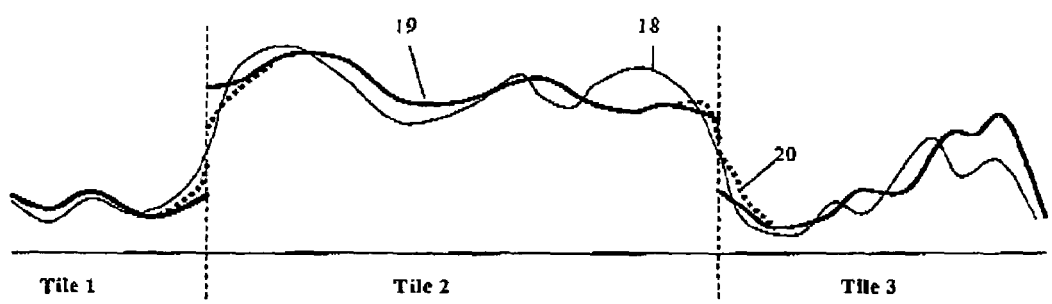
FIG. 3 shows graph of an example of a signal across an image block, together with extensions generated using the conventional symmetric method and the new point-symmetric method according to the invention.

Even though this extension is more efficient than a known periodic one (where the signal is simply repeated at the extension) and is currently employed in most subband systems, it causes boundary artifacts when images are tiled, as shown in FIG. 3, where the narrow solid line shows the signal over a complete tile (Tile 2) and adjacent portions of adjacent tiles (Tiles 1 and 3). The bold line shows the reconstructed signal reconstructed using the known symmetric extension and shows how the reconstructed signal is discontinuous at the boundaries of the tiles. The dotted line shows the reconstructed signal reconstructed using the point symmetric method according to an embodiment of the invention and clearly shows that the discontinuity at the boundaries is eliminated, or at least substantially reduced. This disadvantage of the conventional symmetric approach is also shown in FIG. 2, where there is no smooth transition between the real and extended sequences. Instead, sharp peaks may be produced, as around X[0] for example, that badly affect compression.

Figure 4A:
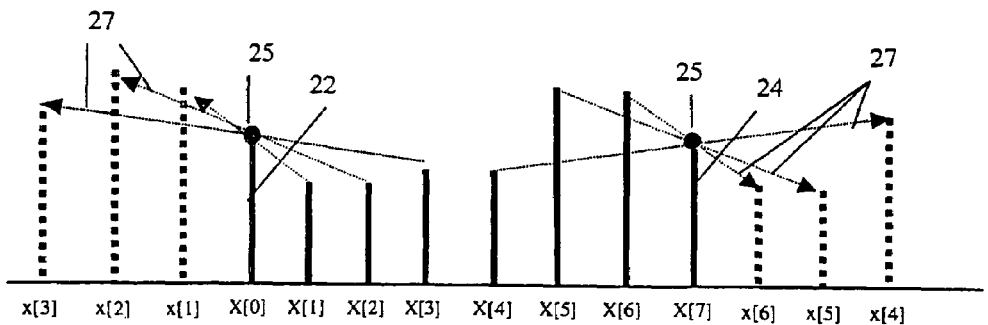
FIG. 4 shows sequences of data samples using point-symmetric extension for whole-sample and half-sample types of symmetry.
Figure 4B:
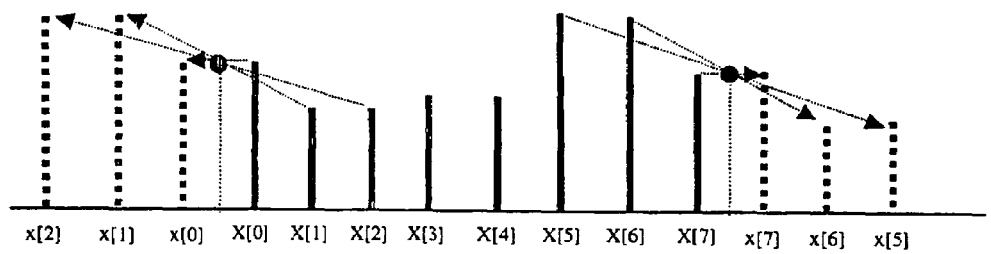

To overcome the problems, an embodiment of the present invention proposes generating the extensions using a different type of symmetry, called hereinafter "point-symmetry" since it uses a different type of symmetry from the single-mirror-symmetry of the conventional extension. An example of the point-symmetric extension is shown in FIG. 4. As shown, the supplementary samples x[i] (dashed lines) are produced from the signal samples X[i] (firm lines) by arrows 27 going through a point of symmetry 25. Actually, two types of the point symmetry are possible: whole-sample (WS) and half-sample (HS). In the first one, a point of symmetry 25 belongs to a boundary samples 17 or 19. In the second one, the point of symmetry 25 belongs to an imaginary sample 21 or 23 located at the halfway between others. Thus, the difference between those types of point symmetry can be considered as the difference in the point of symmetry 25 positioning.

In comparison with the conventional method the proposed one:

minimises the deviation at the tile boundaries of the reconstructed sequences, thus reduces boundary artifacts;

produces more smooth joint between the signal and extension by eliminating the slope discontinuity, thus leads to compression improvement.

The efficiency of reconstruction with the new extension is illustrated in FIG. 3. As shown, the use of the point-symmetric extension results in more accurate reconstruction at the tile boundaries. Thus, it produces a smaller step between adjacent segments of the reconstructed signal approaching that of the originally smooth signal.

A simple formula can be used to calculate the extension x[n] at the beginning and the end of X[n]:

$$x[i]=2*P-X[i], \qquad (2)$$

where i=[1, . . . , k] for odd-length filters, or i=[0, . . . , k−1] for even-length filters P-value of the starting/terminating point of symmetry.

If the beginning of X[n] is extended, the starting point of symmetry belongs X[0]. The terminating point of symmetry is the last sample of X[n] (X[7] in our example shown in FIG. 4). As for the number k of the extension samples required, it is equal to the number of the filter coefficients falling outside the sequences when the filter is positioned at the starting/terminating sample. Although this rule is similar to that one for conventional extension, the required number of the extension samples can be smaller, because the starting/terminating sample can be located not at the tile boundary. This will be illustrated by an example below.

Figure 5:
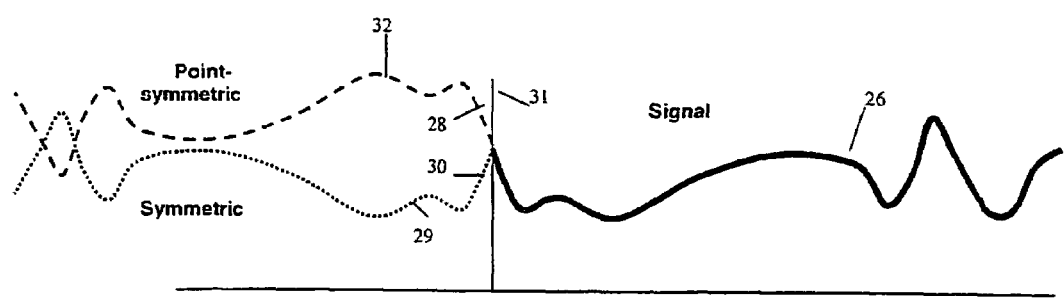
FIG. 5 shows a graph of a signal adjacent one of its boundaries to illustrate the differences between the point-symmetric and conventional symmetric extensions.

The difference between two extensions applied to the same signal is illustrated in FIG. 5. One may notice that the conventional method can produce an artificial sharp peak at the signal boundary, while the point-symmetric extension creates a very smooth joint by eliminating the slope discontinuity.

Figure 6A:
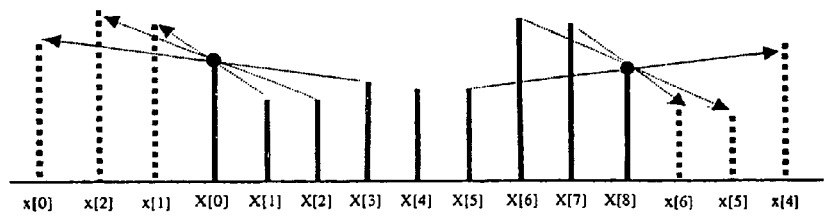
FIG. 6 shows sequences of data samples to illustrate subband analysis and synthesis of odd-length sequences using odd-length filters.
Figure 6B:
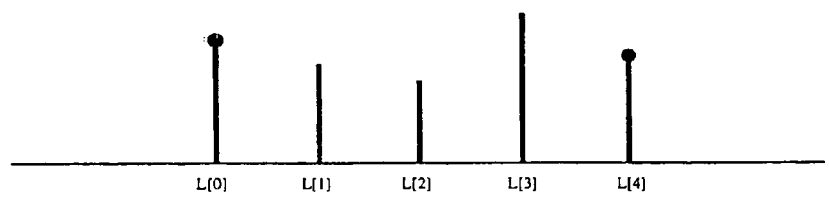
Figure 6C:
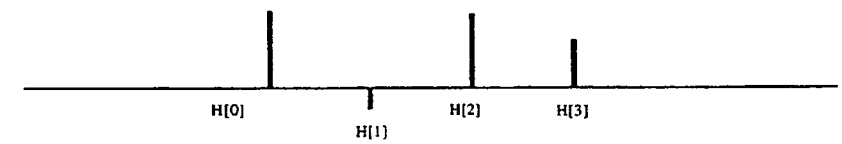
Figure 6D:
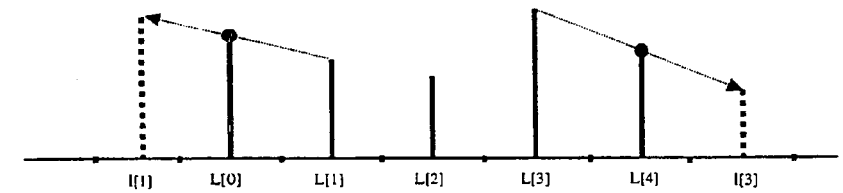
Figure 6E:
Figure 6F:

The same as the conventional method the proposed approach operates slightly different for odd/even-length filters and odd/even-length sequences. Firs of all, WS is applicable to odd-length filters, while HS is used with even-length filters. An example of data flow in odd-length analysis/synthesis filter-bank applied to an odd-length sequence is presented in FIG. 6. At first stage the input sequence X[n] is point-symmetric extended (FIG. 6*a*). After applying the subband analysis, two sequences L[n] (FIG. 6*b*) and H[n] (FIG. 6*c*) are produced. The overall number of subband samples (L[n] and H[n]) is equal to the number of input samples and L[n] subband always contain one more sample than H[n]. At the synthesis stage (FIG. 6 *d–e*) the extension samples are produced using the same rule, but in the high-band the point of symmetry is equal to 0 (FIG. 6*e*). The result of the analysis Y[n] (FIG. 6*f*) has the same number of samples as X[n]. It should be pointed out that this method for many wavelet filters produces L[0]=X[0] and L[M]=X[N], where M and N are maximum indexes of L[n] and X[n] correspondingly. This feature permits to reduce the number of convolution operations in the low-band channel by two and reduce the number of the extension samples required.

In the case of even-length sequences, data reordering is required to preserve the perfect reconstruction property of the filter bank. Although reordering can be carried out in a number of ways it always aims to add missing information about one of the P to the output. An example of data flow in odd-length analysis/synthesis filter-bank applied to an even-length sequence is presented in FIG. 7. Due to the point-symmetric extension of X[n], the last sample in the high-band is always equal to 0 (see FIG. 7*c*). Thus, its position can be used to store some additional information required for lossless reconstruction. One possible solution is illustrated in FIG. 7*d*. H[3] is produced by subtraction L[3] from X[7] (arrow 120). Then L[3] in the low-subband is replaced by X[7] (see FIG. 7*e*, arrow 122). After this rearrangement both subbands contain the same number of samples. At the synthesis section backward data reordering is required. At first, L[3] is set as the point of symmetry of the L[n] end (see FIG. 7*g*, arrow 124). Then L[3] is replaced with the sum L[3]+H[3] (see FIG. 7*g*, arrow 126) and H[3] set to 0 as shown in FIG. 7*f*. Finally, the sequences L[n] and H[n] are extended, filtered and summed together to produce Y[n]. If quantisation is not applied to L[n] and H[n] the output Y[n]=X[n], because this method preserves the perfect reconstruction property.

Figure 8:
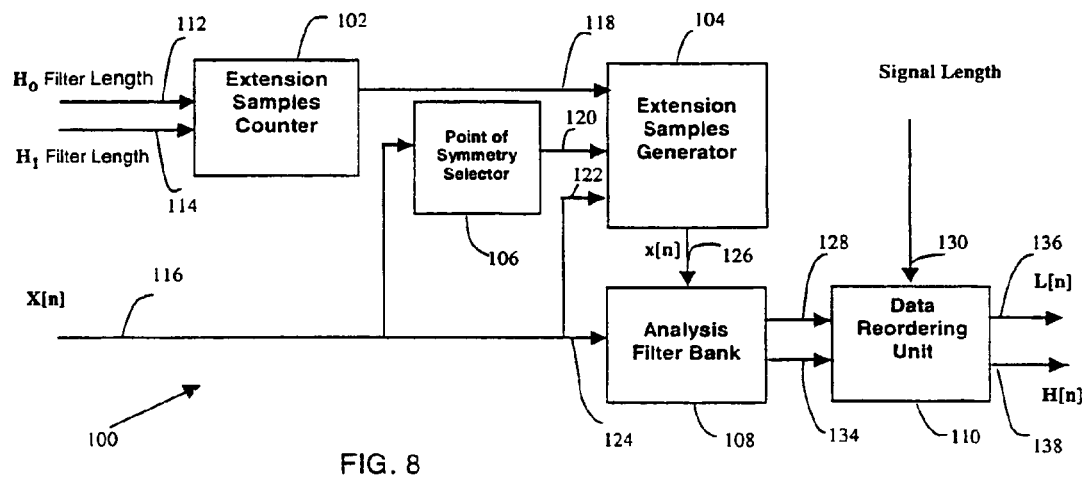
FIG. 8 shows a block diagram of an apparatus for performing one-dimensional subband decomposition of sequences according to an embodiment of the present invention.

The block diagrams of apparatus implementing the subband decomposition is shown in FIG. 8. From the information about low-pass filter length 12 and high-pass filter length 14 applied to the first and second input of the extension samples counter 16, it calculates the number of extension samples k as described earlier. Then k coupled with the extension type (WS if the filters are odd-length, else HS) are passed to the first input 18 of the extension samples generator 26. Two P values corresponding to the starting and terminating points of symmetry are passed from the point of symmetry selector 24 to the second input 20 of the extension sample generator 26. The selector 24 copies those values from the starting and the terminating samples of the input sequence X[n] from input 10, which is also sent to the third input 22 of the extension samples generator 26. The extension samples x[n] are calculated in the extension samples generator 26 using formula (2). Those samples are sent to the second input 32 of the analysis filter bank 30 and together with input samples from 10 applied to its first input 28 are used to perform the subband decomposition as illustrated in FIGS. 6*b–c* and FIGS. 7*b–c*. The output of the analysis filter bank, which consists of the low-pass band 34 and the high-pass band 36 is passed to the first and second inputs of the data reordering unit via the first and second output of the analysis filter bank correspondingly. If the signal length applied to the third input 38 of the data reordering unit 40 is even, the data reordering is performed as it has been described. One example of such reordering is shown in FIGS. 7*d–e*. If the signal length is odd, the data reordering unit 40 simply passes by the samples 34 and 36. The sequences L[n] and H[n] from the first 42 and second 44 output of the data reordering unit 40 comprises the output of apparatus (see FIGS. 6*b–c* if X[n] is odd-length, or FIGS. 7*d–e* if sequence X[n] is even-length).

Figure 9:
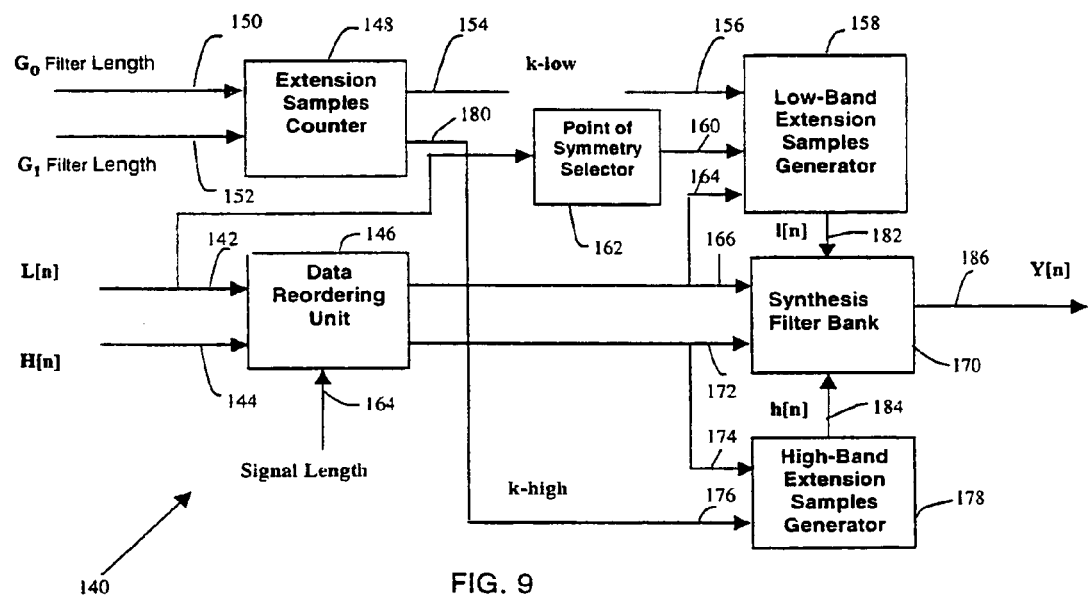
FIG. 9 shows a block diagram of an apparatus for performing one-dimensional subband reconstruction of sequences according to an embodiment of the present invention.

The block diagrams of apparatus implementing the subband reconstruction is shown in FIG. 9. From the low-pass filter length and the high-pass filter length applied to the first 60 and second 62 input of the extension samples counter 64, it calculates the extension types for each channel and the number of extension samples k-low and k-high. The value of k-low coupled with the extension type are passed from the first output 74 to the first input 80 of the low-band extension samples generator 86. At its second input 82 two P values of the starting/terminating points of symmetry is passed from the point of symmetry selector 78. The selector 78 retrieves those values from the starting and the terminating samples of the input sequence L[n], which is applied to its input. The P values are used only in the low-pass channel, because the points of symmetry in the high-pass channel are always equal to 0. The L[n] and H[n] samples are sent to the first 66 and second 68 input of the data reordering unit 70. This unit performs inverse reordering (see for example FIGS. 7*f–g*). Then the reordered low-band samples via the first output of the unit 70 are passed to the first input 88 of the synthesis filter bank 108 and the third input 84 of the generator 86. The reordered high-band samples via the second output of the unit 70 are passed to the second input 90 of the synthesis filter bank 108 and the first input 100 of the generator 106. The extension samples are calculated separately in the low-band extension samples generator 86 and the high-band extension samples generator 106. Then the low-pass band extension and the high-pass band extension are sent to the third 110 and the forth 104 inputs of the synthesis filter bank 108 and together with samples from the first 88 and second 90 inputs are used to perform signal reconstruction. The result of the reconstruction Y[n] (see FIG. 6f) from the output 112 of the synthesis filter bank 108 is the output of apparatus.

It will be appreciated that although only one particular embodiment of the invention has been described in detail, various modifications and improvements can be made by a person skilled in the art without departing from the scope of the present invention.

The invention claimed is:

1. A method of extending a signal having at least a first end, the method comprising the steps of:
   defining a symmetry point at least adjacent the first end;
   determining a portion of the signal adjacent to the defined symmetry point;
   duplicating the determined portion of the signal in a point symmetric fashion about the defined symmetry point; and
   extending the signal from the defined symmetry point using the duplicated portion of the signal, wherein the signal is a digital signal comprising a sequence of discrete digital samples, the sequence having first and second ends with first and final discrete digital samples at the first and final ends and wherein the symmetry point is located external of the first end of the sequence by an amount equal to half of a period between the discrete digital samples in the sequence.

2. A method of extending a signal according to claim 1, wherein the value of the defined symmetry point is zero.

3. A method of extending a signal according to claim 1, wherein the signal has first and second ends and the extension is provided at both ends of the signal.

4. A method of extending a signal according to claim 1, wherein the length of the signal is determined along a horizontal axis of a desired domain in which the signal is available.

5. A method of extending a signal according to claim 4, wherein the length of the signal is determined in a time domain.

6. A method of extending a signal according to claim 4, wherein the length of the signal is determined in a frequency domain.

7. A method of extending a signal according to claim 1, wherein the signal includes at least one set of data from the group of data sets including:
   image data set;
   speech data set;
   acoustic data. set.

8. Apparatus for extending a signal having at least a first end, the apparatus comprising:
   defining means having an input for receiving the signal and an output for providing a defined symmetry point at least adjacent the first end of the signal;
   determining means having an input coupled to the output of the defining means and an output for providing a determined portion of the signal adjacent to the defined symmetry point;
   duplicating means having an input coupled to the output of the determining means and an output for providing a duplicate of the determined portion of the signal in a point symmetric fashion about the defined symmetry point;
   extending means having an input coupled to the output of the duplicating means and an output for providing an extended signal using the duplicated portion of the signal, wherein the signal is a digital signal comprising a plurality of discrete digital samples, the sequence having first and second ends with first and last discrete digital samples at the first and final ends and wherein the symmetry point is located at the first end of the sequence and has a value at least close to the value of the discrete digital sample that is at the first end of the sequence.

9. Apparatus for extending a signal according to claim 8, wherein the value of the defined symmetry point is zero.

10. Apparatus for extending a signal according to claim 8, wherein the signal extension is provided at both ends of the signal of finite length.

11. Apparatus for extending a signal according to claim 8, wherein the signal includes at least one set of data from the group of data sets including:
    image data set;
    speech data set;
    acoustic data. set.

12. Apparatus for extending a signal according to claim 8, wherein the length of the signal is determined along a horizontal axis of a desired domain in which the signal is available.

13. Apparatus for extending a signal according to claim 12, wherein the length of the signal is determined in a time domain.

14. Apparatus for extending a signal according to claim 12, wherein the length of the signal is determined in a frequency domain.

15. A method of extending a signal having at least a first end, the method comprising the steps of:
    defining a symmetry point at least adjacent the first end;
    determining a portion of the signal adjacent to the defined symmetry point; and
    extending the signal from the defined symmetry point using at least one interpolated value obtained from a linear interpolation that has a starting interpolation point at a sampled value in the portion, a mid interpolation point at the symmetry point and an end interpolation point defining the interpolated value that is at a distance from the mid point that is identical to the distance of the sampled value from the mid point.

16. A method of extending a signal as claimed in claim 15, wherein the interpolated value is determined by:
    x[i]=2*P−X[i], where x[i] is the interpolated value, X[i] is an ith said sampled value and P is the symmetry point.

* * * * *